United States Patent
Balakrishnan et al.

(10) Patent No.: US 8,171,220 B2
(45) Date of Patent: May 1, 2012

(54) CACHE ARCHITECTURE WITH DISTRIBUTED STATE BITS

(75) Inventors: Ganesh Balakrishnan, Apex, NC (US); Anil Krishna, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 12/429,586

(22) Filed: Apr. 24, 2009

(65) Prior Publication Data

US 2010/0275044 A1    Oct. 28, 2010

(51) Int. Cl.
    *G06F 12/00*    (2006.01)
(52) U.S. Cl. .......................... 711/118; 711/160
(58) Field of Classification Search .................. 711/118, 711/160, 136, 3
    See application file for complete search history.

(56) References Cited

U.S. PATENT DOCUMENTS

| | | | |
|---|---|---|---|
| 5,594,886 A | 1/1997 | Smith et al. | |
| 6,631,445 B2 | 10/2003 | Rappoport et al. | |
| 6,662,271 B2 | 12/2003 | Smits | |
| 6,959,364 B2 * | 10/2005 | Safranek et al. | 711/146 |
| 6,965,969 B2 | 11/2005 | Burger et al. | |
| 7,020,748 B2 | 3/2006 | Caprioli | |
| 7,069,390 B2 | 6/2006 | Chen et al. | |
| 7,210,021 B2 * | 4/2007 | Sato et al. | 711/220 |
| 2003/0005224 A1 | 1/2003 | Smits et al. | |
| 2003/0236817 A1 | 12/2003 | Radovic et al. | |
| 2004/0098723 A1 | 5/2004 | Radovic et al. | |
| 2005/0132140 A1 | 6/2005 | Burger et al. | |
| 2006/0080506 A1 | 4/2006 | Rajamony et al. | |
| 2006/0112228 A1 | 5/2006 | Shen | |
| 2006/0143400 A1 | 6/2006 | Steely, Jr. | |
| 2006/0155933 A1 | 7/2006 | Buyuktosunoglu et al. | |
| 2007/0014137 A1 | 1/2007 | Mellinger et al. | |
| 2008/0010415 A1 | 1/2008 | Sawdey et al. | |
| 2009/0043995 A1 | 2/2009 | Abernathy et al. | |

OTHER PUBLICATIONS

Changkyu Kim et al., "An Adaptive, Non-Uniform Cache Structure for Wire-Delay Dominated On-Chip Caches," Proceedings o the 10th International Conference on Architectural Support for Programming Languages and Operating Systems, Oct. 5-9, 2002, San Jose, CA, pp. 1-12.

Hassan Ghasemzadeh et al., "Modified Pseudo LRU Replacement Algorithm," Proceedings of the 13th Annual IEEE International Symposium and Workshop on Engineering of Computer Based Systems, 2006 IEEE, pp. 1-6.

Jaehyuk Huh et al., "A NUCA Substrate for Flexible CMP Cache Sharing," 19th International Conference on Supercomputing, ISC'05, Jun. 20-25, 2005, Boston, MA, pp. 1-10.

(Continued)

*Primary Examiner* — Son Dinh
(74) *Attorney, Agent, or Firm* — Yuanmin Cai; Khanh Tran (57) ABSTRACT

Embodiments that that distribute replacement policy bits and operate the bits in cache memories, such as non-uniform cache access (NUCA) caches, are contemplated. An embodiment may comprise a computing device, such as a computer having multiple processors or multiple cores, which has cache memory elements coupled with the multiple processors or cores. The cache memory device may track usage of cache lines by using a number of bits. For example, a controller of the cache memory may manipulate bits as part of a pseudo least recently used (LRU) system. Some of the bits may be in a centralized area of the cache. Other bits of the pseudo LRU system may be distributed across the cache. Distributing the bits across the cache may enable the system to conserve additional power by turning off the distributed bits.

20 Claims, 8 Drawing Sheets

OTHER PUBLICATIONS

Bardine et al., "Way Adaptable D-Nuca Cache," pdf created from html version of cached Google page (http://www.sarc-jp.org/files/foglia/Workshop/Poster%20abstract%20Acaces%202006.pdf), 2006, pp. 1-4.

Naveen Muralimanohar et al., "Interconnect Design Considerations for Large NUCA Caches," http://www.cs.utah.edu/~rajeev/pubs/isca07.pdf, ISCA'07, Jun. 9-13, 2007, San Diego, California, USA, pp. 1-12.

Jaehyuk Huh et al., "Exploring the Design Space of Future CMPs," Proceedings of the 2001 International Conference on Parallel Architectures and Compilation Techniques, Sep. 8-12, 2001, p. 199-210.

U.S. Appl. No. 12/429,622, filed Apr. 24, 2009, Ganesh Balakrishnan et al.

U.S. Appl. No. 12/429,754, filed Apr. 24, 2009, Ganesh Balakrishnan et al.

* cited by examiner

CACHE ARCHITECTURE WITH DISTRIBUTED STATE BITS

TECHNICAL FIELD

The present embodiments generally relate to the management of cache memories of a computing device. More specifically, the embodiments relate to the design and operation of replacement policy bits in cache memories, such as least recently used state bits of cache memories.

BACKGROUND

Cache memories have been used to improve processor performance, while maintaining reasonable system costs. A cache memory is a very fast buffer comprising an array of local storage cells used by one or more processors to hold frequently requested copies of data. A typical cache memory system comprises a hierarchy of memory structures, which usually includes a local (L1), on-chip cache that represents the first level in the hierarchy. A secondary (L2) cache is often associated with the processor for providing an intermediate level of cache memory between the processor and main memory. Main memory, also commonly referred to as system or bulk memory, lies at the bottom (i.e., slowest, largest) level of the memory hierarchy.

In a conventional computer system, a processor is coupled to a system bus that provides access to main memory. An additional backside bus may be utilized to couple the processor to a L2 cache memory. Other system architectures may couple the L2 cache memory to the system bus via its own dedicated bus. Most often, L2 cache memory comprises a static random access memory (SRAM) that includes a data array, a cache directory, and cache management logic. The cache directory usually includes a tag array, tag status bits, and least recently used (LRU) bits. (Each directory entry is called a "tag"). The tag RAM contains the main memory addresses of code and data stored in the data RAM plus additional status bits used by the cache management logic.

Cache sizes are growing, especially lower level (L2 and L3) caches in multi-level cache systems. Large on-die cache memories are typically subdivided into multiple cache memory banks, which are then coupled to a wide (e.g., 32 bytes, 256 bits wide) data bus. Multi-banked caches are often arranged according to a Non Uniform Cache Architecture, especially caches of multi-core chips, also known as Chip-Multi-Processors (CMPs).

As cache sizes continue growing, power consumption is becoming more problematic. Sometimes, if a workload for a system is reduced such that the workload does not require all of the processors or cores of the chip, the system may turn off one or more of the cores, which may allow for power savings by turning off one or more cache memory banks. Current cache memories may employ replacement-policy schemes, such as a pseudo least recently used (LRU) scheme. The replacement-policy bits for the relatively large cache sizes consume considerable amounts of power, in addition to the data storage elements of the caches.

BRIEF SUMMARY

Following are detailed descriptions of embodiments depicted in the accompanying drawings. The descriptions are in such detail as to clearly communicate various aspects of the embodiments. However, the amount of detail offered is not intended to limit the anticipated variations of embodiments. On the contrary, the intention is to cover all modifications, equivalents, and alternatives of the various embodiments as defined by the appended claims. The detailed descriptions below are designed to make such embodiments obvious to a person of ordinary skill in the art.

Some embodiments comprise a method that includes enabling state bits of a pseudo least recently used (LRU) scheme of a cache memory device. The state bits have root-node bits and lower-node bits for cache lines and the lower-node bits are distributed in a plurality of locations of the cache memory device. The method involves disabling bits of a data structure of the cache memory device and disabling state bits associated with the data structure to conserve power. In disabling the state bits, a device switches a plurality of the lower-node bits associated with the data structure without disabling some of the root-node bits.

Further embodiments comprise apparatuses having a plurality of decentralized macros of a cache memory and a cache controller. State bits of a pseudo LRU scheme for the cache memory have root-node bits and lower-node bits. The lower-node bits are stored in the plurality of decentralized macros. The cache controller is arranged to manage the state bits and turn off the lower-node bits to conserve power.

Other embodiments comprise systems having a plurality of processors, a plurality of banks of a cache memory device coupled to the plurality of processors, and a cache controller. The cache memory device comprises a plurality of decentralized arrays. The cache controller sets state bits of a pseudo least recently used (LRU) scheme for the plurality of banks. The state bits comprise root-node bits and lower-node bits. In the systems the lower-node bits are stored in the plurality of decentralized arrays. Further, the cache controller is configured to turn off at a portion of the plurality of decentralized arrays to conserve power.

BRIEF DESCRIPTION OF THE SEVERAL VIEWS OF THE DRAWING

Aspects of the various embodiments will become apparent upon reading the following detailed description and upon reference to the accompanying drawings in which like references may indicate similar elements.

DETAILED DESCRIPTION

The following is a detailed description of novel embodiments depicted in the accompanying drawings. The embodiments are in such detail as to clearly communicate the subject matter. However, the amount of detail offered is not intended to limit anticipated variations of the described embodiments. To the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

In various embodiments, a cache may have many blocks which individually store the various instructions and data values. The blocks in a cache may be divided into groups of blocks called sets or congruence classes. Further, cache memories may be divided into sets and ways. A set may comprise one or more cache lines. For a given memory block, there may be a unique set in the cache that the block can be mapped into, according to preset (variable) mapping functions.

The number of blocks in a set generally refers to the associativity of the cache, e.g. 2-way set associative means that for a given memory block there are two blocks in the cache that the memory block can be mapped into. However, several different blocks in main memory may be mapped to a given set. A 1-way set associative cache is direct mapped, that is, there is only one cache block that may contain a particular memory block. A cache may be said to be fully associative if a memory block can occupy any cache block, i.e., there is one congruence class, and the address tag is the full address of the memory block.

An exemplary cache line (block) may include an address tag field, a state bit field, an inclusivity bit field, and a value field for storing the actual instruction or data. The state bit field and inclusivity bit fields are generally used to maintain cache coherency in a multiprocessor computer system (to indicate the validity of the value stored in the cache). The cache line may also comprise other types of bits, such as error detection and/or error correction bits.

The address tag is usually a subset of the full address of the corresponding memory block. A compare match of an incoming address with one of the tags within the address tag field may indicate a cache "hit". The collection of all of the address tags in a cache (and sometimes the state bit and inclusivity bit fields) is frequently referred to as a directory, and the collection of all of the value fields is often called the cache entry array.

One may note that the following discussion uses the terms "structure", "array", "macro", "centralized", and "decentralized". The terms "structure" and "array" are generally interchangeable and refer to an organized collection of elements for a cache memory. A "macro" may generally refer to a collection or group of structures or arrays. The term "centralized" may be interpreted to describe the physical locality of one structure or macro to a plurality of other structures or macros. In contrast, the term "decentralized" may be interpreted to describe how a plurality of structures or macros may be spread across a cache memory at various locations, not necessarily being located near one specific location.

Generally speaking, methods, apparatuses, and systems that distribute replacement policy bits and operate the bits in cache memories, such as non-uniform cache access (NUCA) caches, are contemplated. An embodiment may comprise a computing device, such as a computer having multiple processors or multiple cores, which has cache memory elements coupled with the multiple processors or cores. The cache memory device may track usage of cache lines by using a number of bits. For example, a controller of the cache memory may manipulate bits as part of a pseudo least recently used (LRU) system. Some of the bits may be in a centralized area of the cache. Other bits of the pseudo LRU system may be distributed across the cache. Distributing the bits across the cache may enable the system to conserve additional power by turning off the distributed bits.

Figure 1:
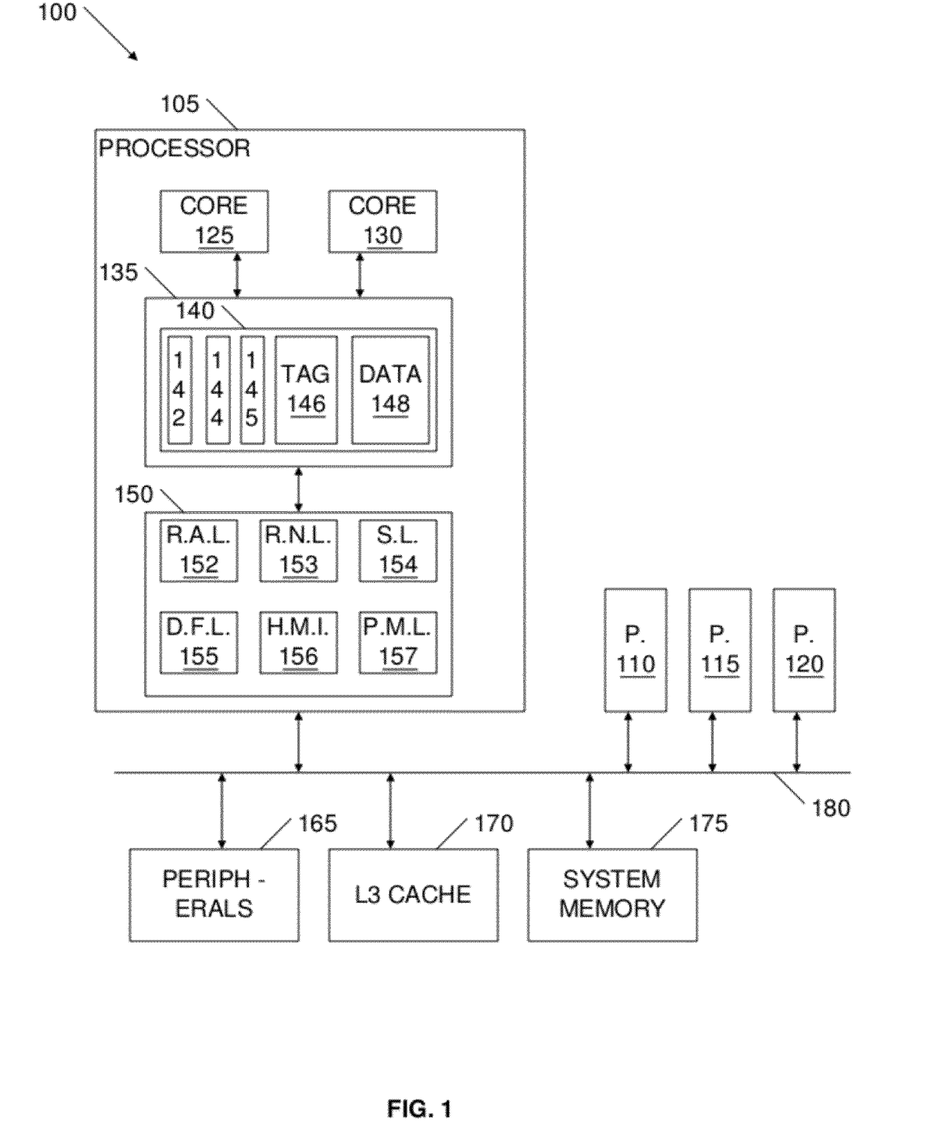
FIG. 1 depicts an embodiment of a system that has distributed replacement policy bits to conserve power in a cache memory device.

Turning now to the drawings, FIG. 1 depicts a system 100 that has replacement policy bits distributed to conserve power in a cache memory, such as a NUCA cache 135. Worth noting, system 100 has NUCA cache 135 but systems and apparatuses of other embodiments may not be limited to NUCA caches. That is to say, alternative embodiments may distribute replacement policy bits to conserve power in other types of cache architectures, such as uniform cache access (UCA) caches.

In numerous embodiments system 100 may comprise a desktop computer. In other embodiments system 100 may comprise a different type of computing device, such as a server, a mainframe computer, part of a server or a mainframe computer system, such as a single board in a multiple-board server system, or a notebook computer. System 100 may operate with different operating systems in different embodiments. For example, system 100 may operate using AIX®, Linux®, Macintosh® OS X, Windows®, or some other operating system. Further, system 100 may even operate using two or more operating systems in some embodiments, such as embodiments where system 100 executes a plurality of virtual machines.

System 100 has four processors, 105, 110, 115, and 120. Different embodiments may comprise different numbers of processors, such as one processor, two processors, or more than four processors. Each processor may comprise one or more cores. For example, processor 105 comprises two cores, 125 and 130, in the embodiment depicted in FIG. 1. Many embodiments may comprise a plurality of cores accessing a plurality of banks of a NUCA cache. As will be illustrated in subsequent figures, an embodiment may comprise four, six, eight, or more cores accessing a number of banks of cache.

While not specifically depicted in FIG. 1, cores 125 and 130 may also each comprise L1 cache. System 100 may also have one or more L2 cache elements, such as NUCA cache 135. NUCA cache 135 may comprise a plurality of banks, such as bank 140. Only one bank is shown for the sake of simplicity. In various embodiments of system 100, one or more of the L1 cache and L2 cache structures, as well as L3 cache 170, may comprise NUCA caches or UCA caches.

System 100 may have replacement policy bits distributed across various types and levels of cache. For example, system 100 may have pseudo LRU replacement bits distributed across NUCA cache 135 and/or L3 cache 170. In many embodiments, NUCA cache 135 may maintain some replacement policy bits on a per-set basis. In other embodiments, NUCA cache 135 may maintain some replacement policy bits on a per-cache line basis.

The memory banks of NUCA cache 135 may be organized into a number of N-ways, where N is a positive integer, in an N-way set associative structure. The different memory banks in NUCA cache 135 may be laid out or organized into a two-dimensional array. Each of the memory banks may include data storage bits 148, tag bits 146, validity bits 144, and replacement bits 142.

Figure 2A:
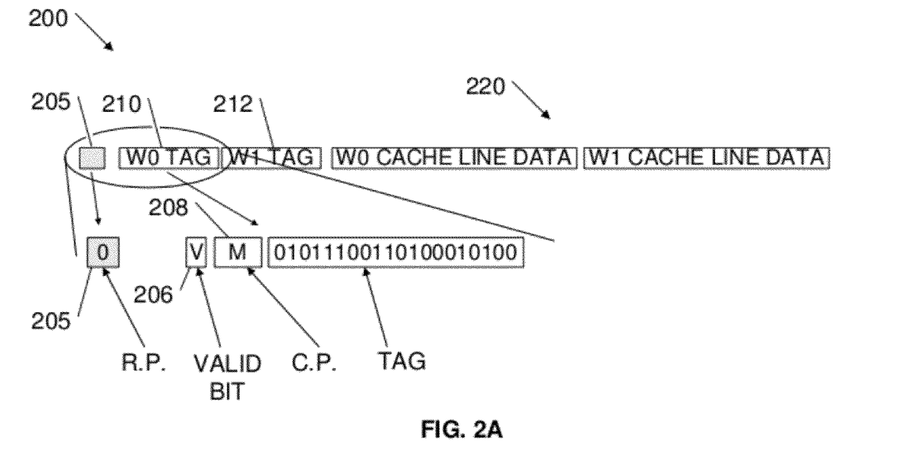
FIG. 2A shows the parts of a set in a 2-way associative cache.

Data storage bits 148 may store data of the cache lines. Tag storage bits 146 may store the tags associated with the cache lines. Data storage bits 148 and tag storage bits 146 may provide bits for numerous sets. FIG. 2A shows the parts of a set 200 in a 2-way associative cache. In at least one embodiment, set 200 may comprise a set in NUCA cache 135, wherein set 200 is spread across bank 140. Set 200 comprises data bits 220, tag bits 210 and 212, and replacement bits 205 for the two cache lines of the two ways in set 200. Replacement bits 205 may comprise one or more pseudo LRU replacement policy bits for set 200. For example, a system may use N−1 replacement bits for an N-way set associative cache. As noted previously, many embodiments may maintain replacement bits per cache set, not per way as illustrated in FIG. 2A.

When looking for a certain cache line, cache controller 150 may use a part of the address bits, known as the index bits, to identify the appropriate set where the line would be if it were in the cache. For example, cache controller 150 may use the index bits to determine that set 200 is storing the desired cache line. Cache controller 150 may then compare the desired tag bits with tag bits 210 and 212 for each of the cache lines in set 200. If cache controller 150 matches the tag bits of the cache line, the cache line being searched is considered found and deemed a cache hit. If none of the lines in the set have a tag bit match, the lookup is considered to be a cache miss. For either a hit or a miss, cache controller 150 updates the replacement policy state bits for set 200, which are replacement bits 205 in FIG. 2A. Replacement bits 205 may correspond to replacement bits 142.

In addition to maintaining replacement bits 205, as well as tag bits 210 and 212, cache controller 150 may also maintain one or more validity bits 206 and one or more coherence policy bits 208 for set 200. Validity bits 206 may correspond to bits of validity bits 144. Coherence policy bits 208 may correspond to bits of coherence bits 145. When a valid bit is asserted (e.g., set to logic TRUE), the assertion may indicate that the corresponding cache line is valid. Otherwise, the corresponding cache line may be invalid. Various embodiments may conserve power by turning off data bits 220, at least some of replacement bits 205, tag bits 210 and 212, validity bits 206, coherence policy bits 208, as well as numerous other bits of other banks in NUCA cache 135 to conserve power.

When a replacement bit of replacement bits 142 is asserted (e.g., set to logic TRUE), the assertion may indicate that the corresponding cache line has been accessed recently. Depending on the states of the bits of replacement bits 142, the states may also indicate that the corresponding cache line has not been accessed recently. In alternative embodiments, any of the bits of data bits 148, tag bits 146, coherence policy bits 145, validity bits 144, and replacement bits 142 may be combined into various numbers of units or into a single unit. For example, tag bits 146 and replacement bits 142 may be located together and accessed in serial before the data of data bits 148 is accessed. Each bank of NUCA cache 135 may be organized similar to bank 140. In other words, embodiments may have portions of the tag array management system distributed among the various banks. Further, some portion of the tag array management system may be centralized, such as a centralized location for a number of the policy replacement bits. For example, if NUCA cache 135 has sixteen banks, some LRU bits may be maintained in a single centralized location, while other LRU-related bits are spread out through various locations of NUCA cache 135 for the sixteen banks.

The processors of system 100 may be connected to other components via a system or fabric bus 180. Fabric bus 180 may couple processors 105, 110, 115, and 120 to system memory 175. System memory 175 may store system code and data. System memory 175 may comprise dynamic random access memory (DRAM) in many embodiments, or static random access memory (SRAM) in some embodiments, such as with certain embedded systems. In even further embodiments, system memory 175 may comprise another type of memory, such as flash memory or other nonvolatile memory.

Processor 105 of system 100, as well as any of processors 110, 115, and 120, represents one processor of many types of architectures, such as an embedded processor, a mobile processor, a micro-controller, a digital signal processor, a superscalar processor, a vector processor, a single instruction multiple data (SIMD) processor, a complex instruction set computer (CISC) processor, a reduced instruction set computer (RISC) processor, a very long instruction word (VLIW) processor, or a hybrid architecture processor.

Processor 105 has cache controller 150 to support the access and control of a plurality of cache ways in NUCA cache 135. The individual ways may be selected by a way-selection module residing in cache controller 150. Cache controller 150 may control NUCA cache 135 by using various cache operations. These cache operations may include placement, eviction or replacement, filling, coherence management, etc. In particular, cache controller 150 may perform the operations which implement a pseudo-LRU replacement policy, sometimes referred to as a tree-LRU, for NUCA cache 135.

Cache controller 150 may comprise a hit/miss/invalidate detector 156, replacement assert logic 152, replacement negate logic 153, search logic 154, and data fill logic 155 which work in conjunction with power management logic 157. During operation of system 100, power management logic 157 may turn off banks of NUCA cache 135 to conserve power. For example, power management logic 157 may turn off data bits 148, tag bits 146, coherence policy bits 145, validity bits 144, and replacement bits 142 of bank 140 to conserve power during a period of inactivity. When the activity of system 100 increases, power management logic 157 may turn bank 140 back on.

The configuration of cache controller 150 may vary from embodiment to embodiment. Any combination of the modules of cache controller 150 may be integrated or included in a single unit or logic of cache controller 150. Some embodiments of cache controller 150 may contain more or fewer than the above modules or components. For example, in an alternative embodiment, cache controller 150 may also comprise a cache coherence manager.

As alluded to previously, system 100 may utilize a coherency protocol. For example, one embodiment of system 100 may utilize a MESI (modified-exclusive-shared-invalid) protocol, or some variant thereof. Each cache level, from highest (L1) to lowest (L3), may successively store more information, but at a longer access penalty. For example, the on-board L1 caches in processor cores 125 and 130 might have a storage capacity of 256 kilobytes of memory, NUCA cache 135 might have a storage capacity of 2048 kilobytes common to both cores, and L3 cache 170 might have a storage capacity of 16 megabytes (MB). While many embodiments may use the techniques of distributed replacement policy bits as described herein to conserve power in L2 cache banks, some alternative embodiments may also use the techniques for other hierarchical types of cache. For example, some embodiments may distribute replacement policy bits across a relatively large bank of L1 cache for two closely coupled cores. Alternatively, some embodiments may distribute policy replacement bits across banks of L3 cache 170.

The processors of system 100 may be connected to various peripherals 165, which may include different types of input/output (I/O) devices like a display monitor, a keyboard, and a non-volatile storage device, as examples. In some embodiments, peripherals 165 may be connected to fabric bus 180 via, e.g., a peripheral component interconnect (PCI) local bus using a PCI host bridge. A PCI bridge may provide a low latency path through which processors 105, 110, 115, and 120 may access PCI devices mapped within bus memory or I/O address spaces. Cache controller 150 may be configured to interact with peripherals connected to the PCI host bridge. For example, cache controller 150 may receive data from and send data to storage devices coupled to PCI slots. Cache controller 150 may reorganize the data of the banks during operation and periodically write the contents back out to the data storage devices when performing tasks related to power management using distributed replacement policy bits.

A PCI host bridge may also provide a high bandwidth path to allow the PCI devices to transfer data to and from system memory 175. Such PCI devices may include, e.g., a network adapter, a small computer system interface (SCSI) adapter providing interconnection to a permanent storage device (i.e., a hard disk), and an expansion bus bridge such as an industry standard architecture (ISA) expansion bus for connection to input/output (I/O) devices.

Figure 2B:
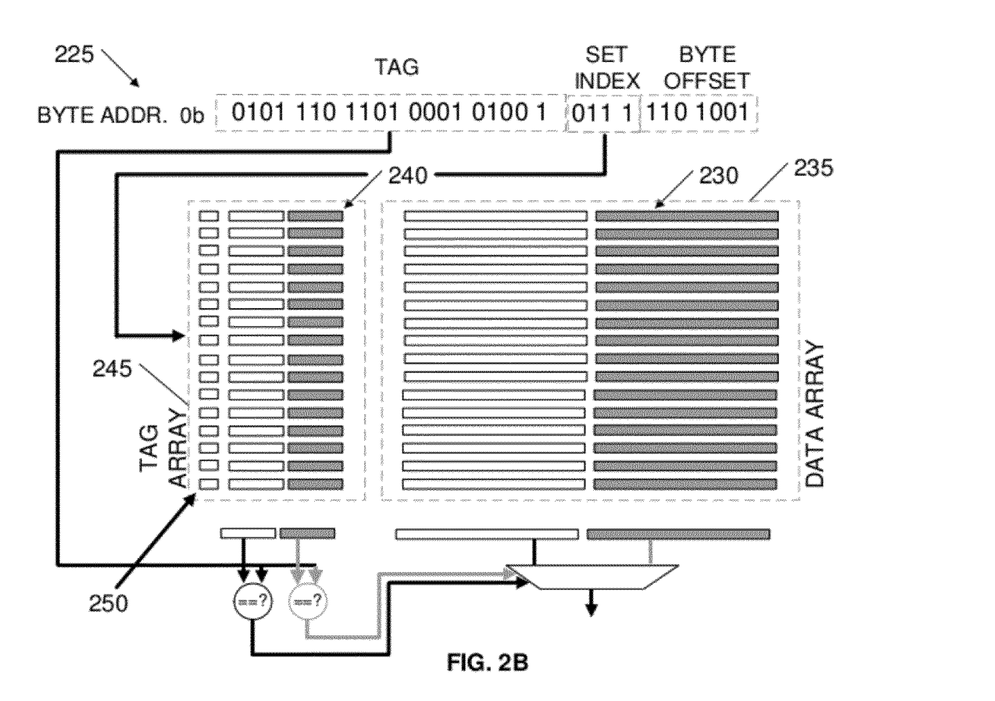
FIG. 2B illustrates how a system may conserve power by switching off some of the ways in a set-associative cache.

FIG. 2B illustrates how a system may conserve power by switching off some of the ways in a set-associative cache 225. In a cache design, be it UCA, Static NUCA, Dynamic NUCA, or Requester-Sensitive Dynamic NUCA, the cache line replacement state may be maintained on a per set basis, without any finer granularity. Maintaining the replacement state on a per set basis enables changes to the ranking of multiple cache ways of the set whenever a cache lines is accessed, either due to a hit or a miss. When a system requires power-savings in a cache, and portions of the cache need to be turned off, the system may turn off some of the ways in a set-associative cache. Turning off some of the ways generally involves no change to the tag or index length.

To conserve power in cache 225, the system may turn off the data bits of ways 230 in every set of data array macro 235. With the data bits turned off, the system may conserve additional power by turning off all state bits 240 in tag array macro 245 associated with the data bits that are switched off. For example, the system may turn off tag bits, coherence bits, error detection bits, error correction bits, and validity bits associated with the data bits of ways 230. Bits or circuits of cache 225 that are turned off are shown blackened.

LRU bits 250 may comprise too small an array to switch off only a portion. In other words, the circuitry required to disable a limited number of LRU bits 250 may itself require additional power and unnecessarily complicate the design of cache 225. As a result, the system may leave all bits of LRU bits 250 enabled and consuming power, but only use and update a portion of the bits. To enable turning off the data bits and associated state bits, the data and state bits may both be part of a separate sub-bank, such as in a single-bank UCA cache, or a separate bank, such as in a NUCA cache. In other words, a system may more easily turn off groups of bits arranged as part of a macro. Before switching off a macro, the system will generally insure that any modified data in the macro is not lost. For example, the system may write the data to the next lower level of the memory hierarchy.

Figure 2C:
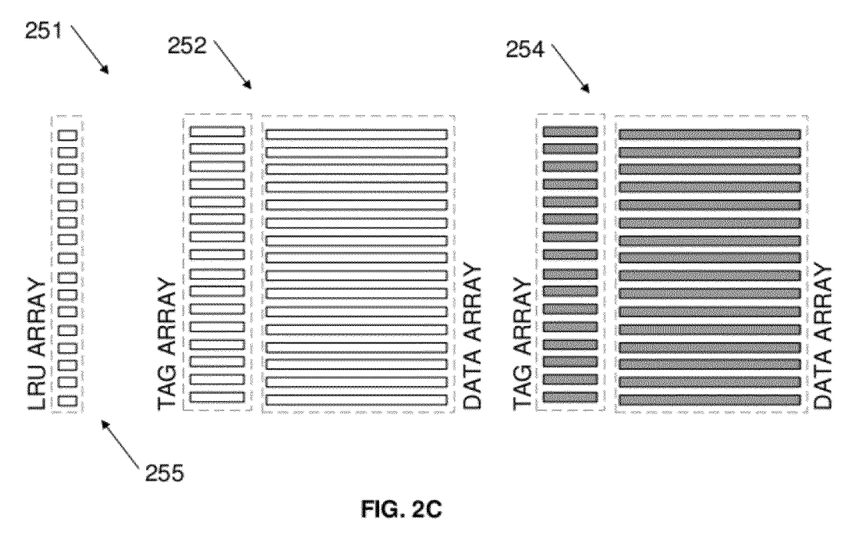
FIG. 2C illustrates how macros may be arranged in a cache.

FIG. 2C illustrates how macros 252 and 254 may be arranged in a cache 251. Ways are spread across macros 252 and 254, enabling a system to more easily switch off a subset of all ways and conserve power. In other words, way-specific state and data bits are arranged into separate macros that enable an individual macro to be turned off for power savings. Macros 252 and 254 may be located in two sub-banks within a bank of a UCA cache, within a bank of a NUCA, or two independently accessible banks of a NUCA. Each macro may hold more than one way, although FIG. 2C illustrates each macro holding data and state corresponding to only one way.

Similar to LRU bits 250 in FIG. 2B, replacement-policy-related state bits in LRU array 255 form a relatively small centralized macro. A system may still have difficulty turning off only portions of LRU array 255, even though fewer LRU bits are needed when bits of a macro are turned off. Separating the bits of LRU array 255 into multiple independent macros that can be powered down may not result in an efficient design. A design dividing LRU array 255 into multiple independent macros may consume more power and require more complex logic to access and maintain the LRU bits. Consequently, the system may retain all bits of LRU array 255 but modify the associated control logic appropriately.

Figure 3A:
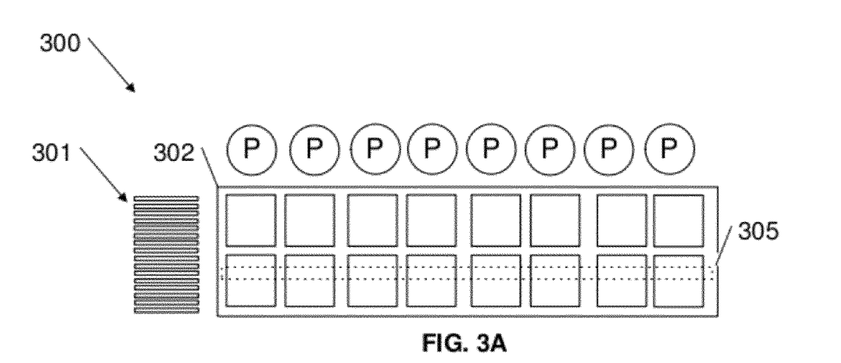
FIG. 3A depicts a large multi-banked lower level cache in a multi-processor system.

FIG. 3A depicts a large multi-banked lower level cache in a multi-processor system 300. In system 300, LRU bits of array 301 are centrally organized. In other words, array 301 may comprise the replacement-policy-related state bits for NUCA cache banks 302, wherein the LRU bits of array 301 are grouped together in a non-distributed structure and separately located from NUCA cache banks 302. As FIG. 3A illustrates, ways of a set 305 are striped set across eight banks. Thus, the associativity of set 305 is eight, or a multiple of eight depending upon the number of ways per set that each bank holds. As one skilled in the art will appreciate, the striping of ways across multiple banks may similarly be implemented for sub-banks in a single bank. In a NUCA cache having multiple banks similar to the banks depicted in FIG. 3A, the impact of having LRU bits in a non-distributed array 301 may be significant in terms of power and performance.

Figure 3B:
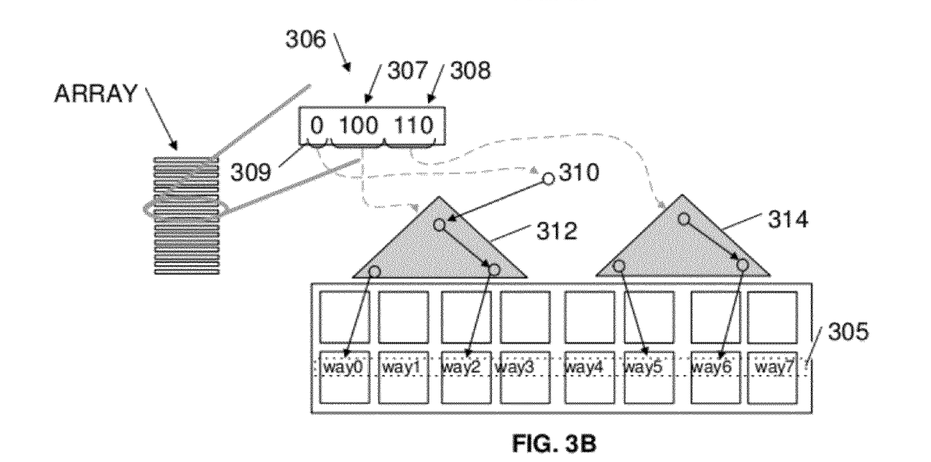
FIG. 3B shows how pseudo LRU state bits may be interpreted to identify the recency ranking of various ways that make up a cache set.

FIG. 3B shows how the pseudo LRU state bits, such as the LRU bits of array 301, may be interpreted to identify the recency ranking of the various ways that make up cache set 305. Assuming each bank holds one way, the NUCA cache shown in FIG. 3B is an 8-way set associative cache. The pseudo LRU state may require 7 bits per set for an 8-way set-associative cache. FIG. 3B gives an example 7 bits (element 306) and illustrates how the bits maintain the LRU ranking for the ways of set 305. For the NUCA cache depicted in FIG. 3B, a 0 at a tree node points to a left sub-tree, while a 1 points to a right sub-tree. For example, root node 310, corresponding to root bit 309, being equal to zero points to sub-tree 312 instead of sub-tree 314. While root bit 309 indicates whether sub-tree 312 or sub-tree 314 should be searched, lower-node bits 307 and lower-node bits 308 indicate how sub-trees 312 and 314 should be searched.

Figure 3C:
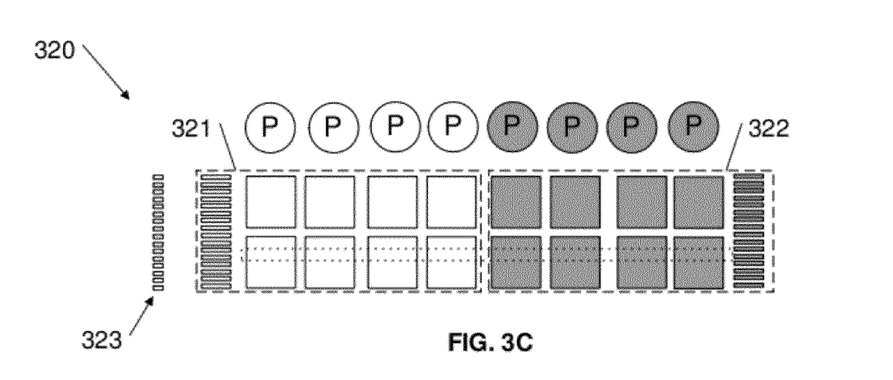
FIG. 3C illustrates how LRU state bits may be distributed and enable conservation of power by turning off some of the LRU state bits.

In a system containing the cache of FIG. 3B, the application workload may not require all the available processing power of all the processors whereupon some cache banks may be turned off to conserve power and, potentially, improve performance. FIG. 3C shows an example scenario where 4 out of 8 processors and 8 out of 16 banks are turned off (shown darkened). The LRU bits maintained in array 301 cannot be turned off as easily because array 301 is a separate centralized structure. In other words, the LRU bits of array 301 are not spread across the macros making up the cache banks 302.

The number of bits needed to maintain the LRU ranking for a given set may be some small number of bits and equal to (N−1) bits for an N-way set associative cache. As previously described, a system employing the cache depicted in FIG. 3B may require 7 bits. As noted in the discussion for FIGS. 2B and 2C, the LRU array structures may not be very wide, with each row containing many fewer bits than the macros that make up the banks. Slicing the LRU array up into many narrower vertical slices to ease switching off sections of the LRU array may not be cost or power-effective. In other words, a multi-array structure for the macro holding the LRU state may burn more power than a single-array design when the multi-array design is fully powered and evaluated to determine the amount of power saved when parts of the multi-array are switched off.

FIG. 3C depicts one embodiment of a system 320 illustrating how LRU state bits may be distributed and enable conservation of power by turning off some of the LRU state bits. The arrays containing the state bits may be integrated into cache macros 321 and 322, which distribute the LRU state bits across the cache. System 320 and other embodiments may use the pseudo LRU replacement policy, such as the LRU policy illustrated in FIG. 3B. In a pseudo LRU tree the bits may be divided between groups of banks, such as the banks of macros 321 and 322, with a small number of LRU state bits at the root of the pseudo LRU tree retained in centralized structure 323. System 320 may leave the LRU bits in structure 323 turned on, yet turn off the LRU state bits distributed and integrated into macros 321 and 322 when a respective macro is turned off.

Figure 3D:
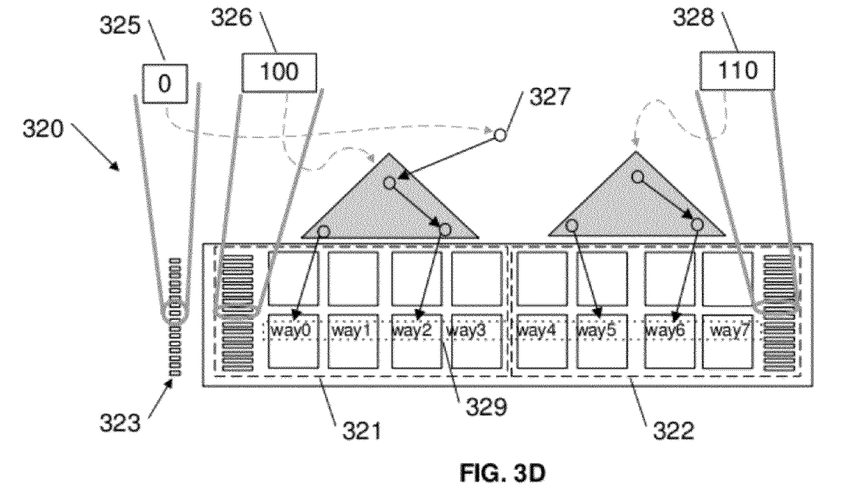
FIG. 3D illustrates how each bank may hold one way, making a cache 8-way set associative.

FIG. 3D illustrates how each bank may hold 1 way, making the cache 8-way set associative. With an 8-way set associative cache, the pseudo LRU state may require 7 bits per set. FIG. 3D also illustrates how the 7 bits may be distributed and how the 7 bits may indicate the LRU ranking. Like system 320, an embodiment may divide the 7 bits into three separate parts of one, three, and three bits. The single bit 325 may represent the root 327 of the pseudo LRU tree.

System 320 may maintain single bit 325 in centralized structure 323. System 320 may store the three bits 326 corresponding to 4 ways of set 329, in the left 4 banks of the set, in macro 321. Being physically located in macro 321, system 320 may switch off the three bits 326 if the 4 ways of macro 321 are switched off for power savings. The three bits 328, corresponding to the 4 ways of set 329 that reside in the right 4 banks of set 329, are stored in macro 322. System 320 may switch off the three bits 328 if the 4 ways of macro 322 are switched off for power savings. As FIG. 3D illustrates, system 320 is designed with space for the pseudo LRU bits to be incorporated into the cache arrays. Each 4-bank structure with the built-in LRU bits may form a basic building block to build 4, 8, and other multiple-of-4 way caches. Of course, alternative embodiments are not restricted to a 4-way basic building block and may employ different numbers of ways.

When a system like system 320 distributes pseudo LRU bits in the manner illustrated in FIGS. 3C and 3D, the system may easily turn off portions of the pseudo LRU bits when portions of the banks in the cache are turned off. As a specific illustration, a system may easily turn off pseudo LRU bits associated with a building-block of banks when the banks of the building-block are switched off. For example, system 320 may turn off all of the LRU bits associated with 4 ways, in FIG. 3C, when 4 ways comprise a building block of banks. In some alternative embodiments, a system may turn off pseudo LRU bits associated with smaller portions of cache memory that are turned off, such as a limited number of ways of a set of banks instead of all of the ways of the banks. In other words, the alternative embodiments may turn off portions of banks and some of the associated LRU bits without shutting down the banks entirely.

FIGS. 3C and 3D also illustrate some of the benefits of distributing the LRU bits. First, distributing the LRU bits may drastically reduce the size of the centralized lookup structure 323, from 7 bits to 1 bit for each set in the embodiment of system 320. Second, distributing the LRU bits may enable system 320 to more easily turn off the LRU bits corresponding to the ways that are turned off. Turning off the LRU bits corresponding to the ways turned off is generally not possible, economically feasible, or implementable in a simplistic manner with a centralized LRU array. Third, distributing the LRU bits may not affect the lookup accuracy, because in switching off half a pseudo LRU tree the protocol may make sure the root node bit is not updated to point to the part of the pseudo LRU tree that is switched off. Fourth, system 320 may reduce the amount of power required for cache line lookup because there may be no unnecessary state changes required for the bits corresponding to the powered-down banks. Additionally, the design of the cache is more scalable with distributed LRU bits. In contrast, a system having a larger associativity will generally have a linear increase in power consumption with the larger centralized structure of the LRU bits.

Figure 3E:
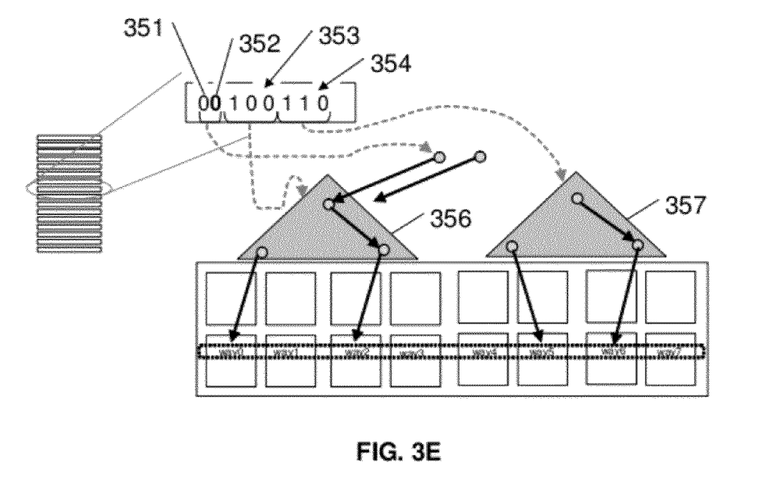
FIGS. 3E-3G illustrate an alternative embodiment wherein the LRU bits may be distributed in a different manner.
Figure 3F:
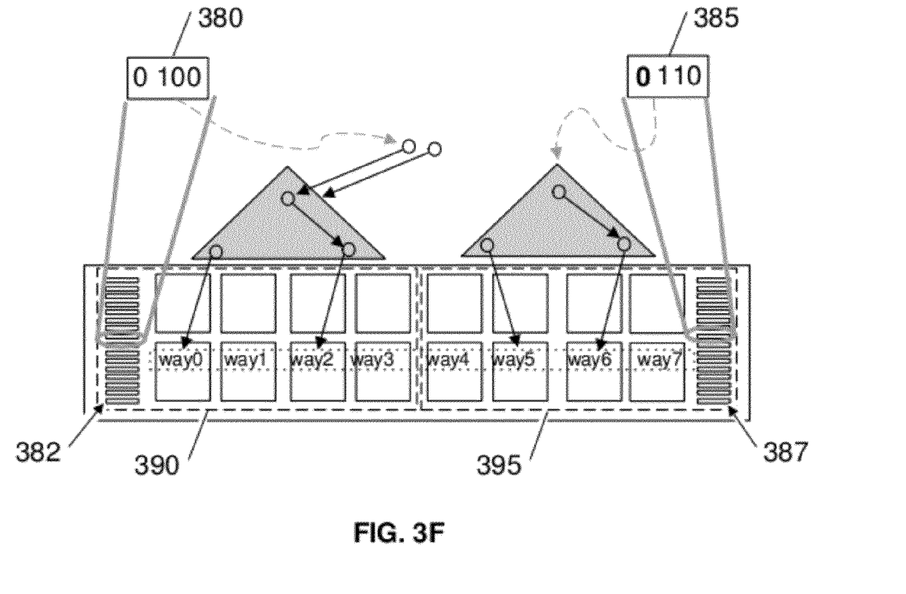
Figure 3G:
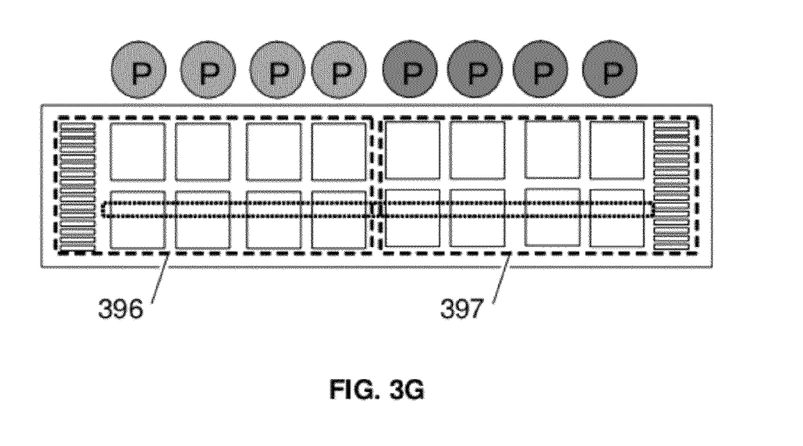

While FIGS. 3C and 3D illustrate one embodiment of how LRU bits may be distributed, FIGS. 3E, 3F, and 3G illustrate an alternative embodiment wherein the LRU bits may be distributed in a different manner. In the embodiment of FIG. 3E, the root bit 351, or some higher order bits of the pseudo LRU tree, may be replicated via a second root bit 352 and distributed across the cache macros, such as macros 390 and 395 shown in FIG. 3F. Lower-node bits 353 may represent the left portion 356 of the LRU tree, while lower-node bits 354 may represent the right portion 357 of the LRU tree. Root bit 351 may be combined with lower-node bits 353 to form a first grouping of bits 380. The first grouping of bits 380 may be stored in an array 382 of macro 390. Similarly, the replicated root bit 352 may be combined with lower-node bits 354 to form a second grouping of bits 385. The second grouping of bits 385 may be stored in an array 387 of macro 395.

Replicating the single root bit and distributing the different root bits to separate macros may enable a more symmetrical distribution of pseudo LRU bits, which in turn may lead to a more modular design for the cache arrays, as FIG. 3G illustrates. In other words, FIG. 3G illustrates how the centralized structure 323 of FIG. 3C may be eliminated by replicating the root bits of the centralized structure 323 and distributing such root bits across macros of the cache. Each macro may comprise the elements surrounded by each of the dotted rectangles, the banks inside macros 396 and macro 397. Further, each macro may comprise a modular building block.

Figure 4A:
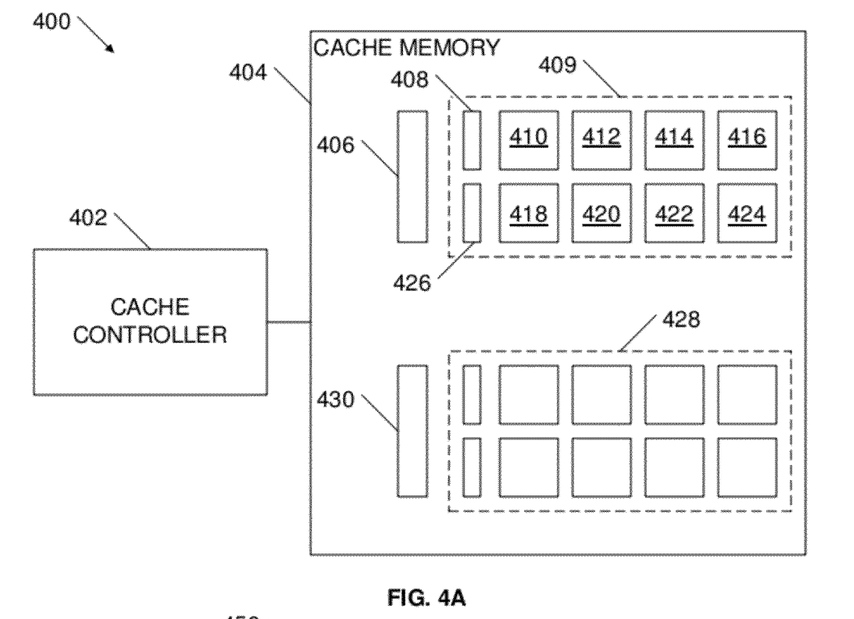
FIGS. 4A-4B show two different embodiments of apparatuses having distributed LRU state bits that enable power conservation.
Figure 4B:
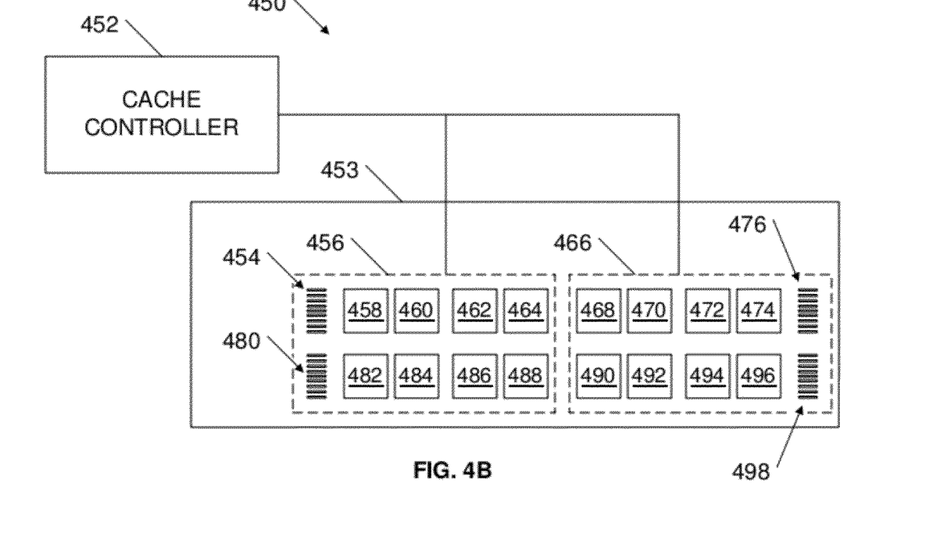

FIGS. 4A and 4B show two different embodiments of apparatuses having distributed LRU state bits that enable power conservation. As FIG. 4 shows, apparatus 400 comprises a cache controller 402 and a cache memory 404. In some embodiments, cache memory 404 may comprise a UCA cache. In other embodiments, cache memory 404 may comprise a NUCA cache.

Apparatus 400 is configured to save power via LRU state bits distributed across cache memory 404. Cache memory 404 comprises two centralized structures, structure 406 and structure 430. For example, structure 406 is located in a central location for macro 409, while structure 430 is located in a central location for macro 428. Cache controller 402 may maintain root-node bits in structures 406 and 430 for a pseudo LRU scheme. Cache controller 402 may also maintain lower-node bits for the pseudo LRU scheme in a plurality of decentralized structures, such as structures 408 and 426.

For the sake of illustration, structure 406 may correspond to the structure 323 depicted in FIG. 3C, with macro 409 corresponding to macro 321. Decentralized structures 408 and 426 may correspond to the array structures shown in the left-hand side of macro 321. In maintaining the state bits of the pseudo LRU scheme for macro 409, cache controller 402 may manipulate root-node bits in structure 406. Further, cache controller 402 may manipulate lower-node bits in structure 408 when searching or accessing data in banks 410, 412, 414, and 416, yet manipulate lower-node bits in structure 426 when searching or accessing data in banks 418, 420, 422, and 424. Likewise, cache controller 402 may manipulate other root-node bits of additional centralized structures and other lower-node bits of additional decentralized structures, such as root-node bits of centralized structure 430 for macro 428.

The arrangement shown in FIG. 4A is just one embodiment of an apparatus that may have distributed LRU bits in a cache memory to conserve power. Other arrangements and configurations are possible in alternative embodiments. For example, in many apparatuses, the macros may contain more than eight banks or fewer. Some apparatuses may have a plurality of cache controllers, such as one cache controller for a specified number of banks or macros.

FIG. 4B shows an alternative embodiment of an apparatus 450 configured to save power via LRU state bits distributed across a cache memory 453. Contrasted with apparatus 400, apparatus 450 may not need to have root-node bits in centralized structures of cache memory 453. Instead, cache controller 452 may manipulate both root-node bits and lower-node bits in decentralized structures across cache memory 453.

For a first macro 456 of cache memory 453, cache controller 452 may manipulate both root-node bits and lower-node bits in decentralized structures, arrays 454 and 480. For example, cache controller 452 may set or reset both root-node bits and lower-node bits located in array 454 when accessing or searching for data of cache lines in banks 458, 460, 462, and 464. Cache controller 452 may also manipulate both root-node bits and lower-node bits located in array 480 when accessing or searching for data of cache lines in banks 482, 484, 486, and 488. Similarly, for macro 466, array 476 may store the root and lower-node state bits for banks 468, 470, 472, and 474, while array 498 may store the root and lower-node state bits for banks 490, 492, 494, and 496.

A root bit, or some higher order bits of the pseudo LRU tree for a set of cache lines in banks 458, 460, 462, 464, 468, 470, 472, and 474, may be replicated via a second, duplicate, root bit. Replicating the root bits for each of the sets for the banks of macros 456 and 466, and placing the duplicate root bits in arrays 476 and 498, may allow cache controller 452 to turn off all banks and array elements of macro 456 to conserve power, yet maintain the LRU state bits for the cache lines of banks 468, 470, 472, 474, 490, 492, 494, and 496. Similarly, the root bits for the banks of macros 456 and 466 may be combined in groups with lower-node bits for the same banks and stored in arrays 454 and 480, enabling the elements of macro 466 to be powered down.

One or more elements of the apparatuses in FIGS. 4A and 4B may be in the form of hardware, software, or a combination of both hardware and software. Some modules may comprise software or firmware instructions of an application, executed by one or more processors. For example, in many embodiments cache controller 402 may comprise a state machine and/or switching logic. However, in some embodiments, cache controller 402 or cache controller 452 may comprise instruction-coded modules stored in memory devices, executed by integrated processors. The integrated processors may execute instructions and determine which banks should be turned on and off as part of comprehensive power management schemes among the macros of the cache memory devices.

In many embodiments, cache memory 404 and/or cache memory 453 may comprise NUCA caches. In such embodiments the caches may comprise horizontally-striped NUCA caches. In other words, the cache memory device may contain a plurality of banks wherein ways are horizontally distributed across multiple banks. In at least some embodiments, cache memory 404 and/or cache memory 453 may comprise UCA caches.

While not specifically shown, people having ordinary skill in the art will appreciate that cache memories 404 and 453 may each be coupled to a plurality of processors. For example, the embodiments depicted in FIGS. 3C and 3G are each coupled with eight processors. The number of processors may vary from embodiment to embodiment. Further, one will appreciate that the number of macros, the number of structures, the number of banks, the number of banks per macro, and the arrangements of the structures in relation to the macros may vary in different embodiments.

One should also note that even though the embodiments of FIGS. 3C and 3G have a one-processor-to-one bank correspondence, alternative embodiments may not have such one-to-one correspondence. For example, one embodiment may have four processors coupled to an array of banks that is eight banks wide and twelve banks deep (eight horizontal columns by twelve horizontal rows). Stated differently, the row of the four processors may face a row of eight banks. Further, while the descriptions of embodiments thus far have applied to rectangular (2 dimensional) layouts of cache banks with linear (1 dimensional) layouts of processors, the teachings disclosed for the various embodiments may nonetheless be extended to more complex layouts of processors and caches.

Even further embodiments may comprise modules or elements other than those depicted in FIGS. 4A and 4B. For example, some embodiments may comprise an activity monitor to monitor the activity of one or more NUCA caches. The activity monitor may detect when an apparatus or system enters a lower processor activity state, which may present an opportunity for turning off one or more banks, or larger portions such as one or more macros, to conserve power.

Figure 5:
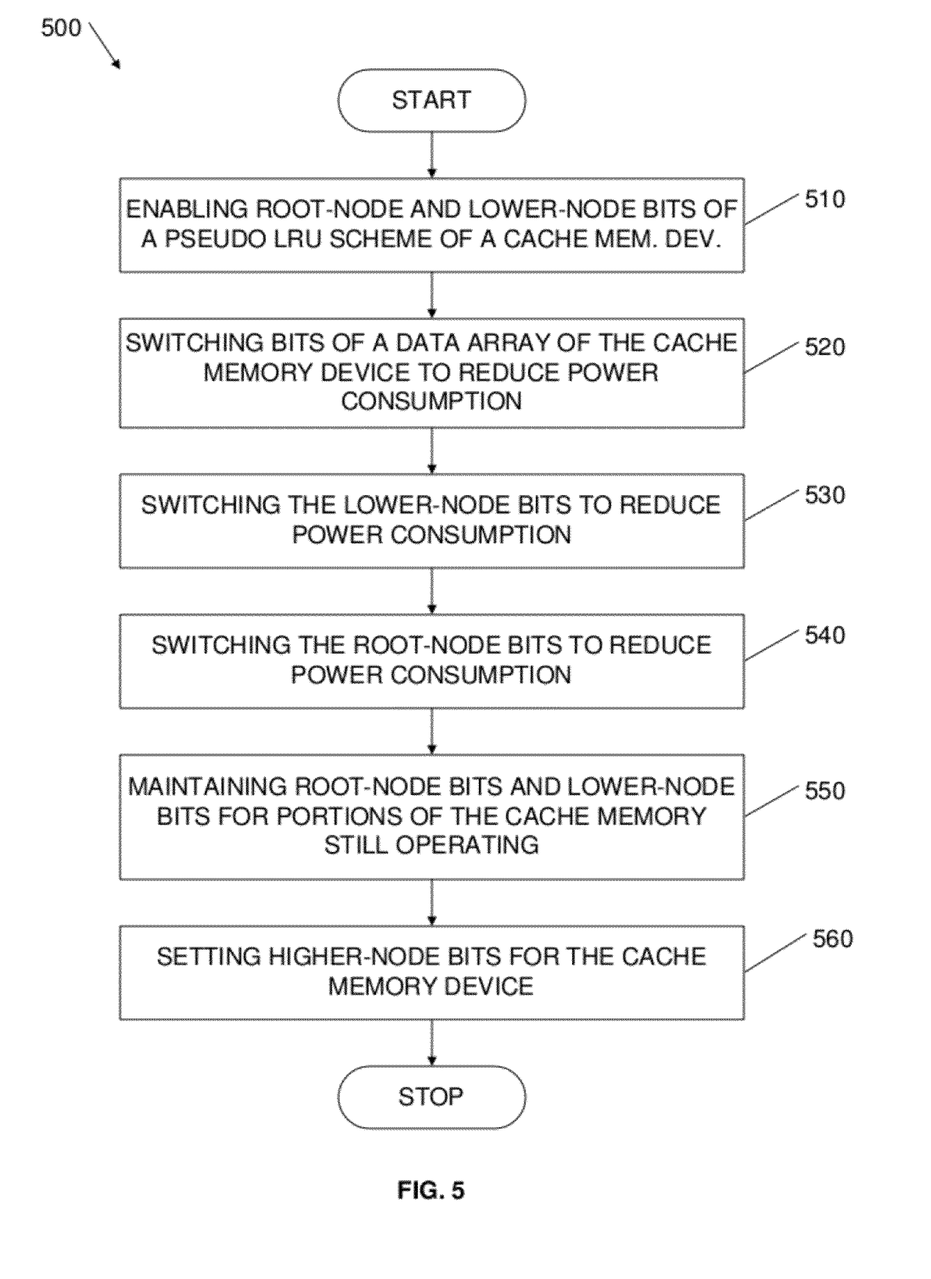
FIG. 5 illustrates one method for operating a cache memory device that has distributed pseudo LRU bits to conserve power.

FIG. 5 illustrates a flowchart 500 of a method for operating a cache memory device that has distributed pseudo LRU bits to conserve power. For example, one or more embodiments of apparatus 400 or 450 shown in FIGS. 4A and 4B may implement the method described by flowchart 500 to conserve power in operating cache memories 404 or 453, respectively.

As the system coupled to apparatus 400 or 450 operates, the system may enable root-node and lower-node bits of a pseudo LRU scheme of a cache memory device (element 510). For example, apparatus 450 may enable or switch on the root-node bits and lower-node bits in a NUCA cache of a system, such as the system depicted in FIG. 3G. The root-node bits and the lower-node bits may reside in a plurality of decentralized structures, such as arrays 454 and 480 in macro 456, and arrays 476 and 498 in macro 466.

While the system coupled to apparatus 450 operates, apparatus 450 may switch bits of a data array of the cache memory device to reduce power consumption (element 520). For example, cache controller 452 may turn off bits of the banks in macro 466 to turn off the banks. However, cache controller 452 may leave the elements of macro 456 powered up and operating. Cache controller 452 may also switch the lower-node bits (element 530) and switch the root-node bits (element 540) to further reduce power consumption. Such lower-node bits and root-node bits associated with the banks of macro 466 may reside in arrays 476 and 498, separated in the manner described in the discussion for FIG. 3F. Stated differently, cache controller 452 may turn off arrays 476 and 498 when turning off the banks of macro 466.

As the system continues operating, the system may maintain root-node bits and lower-node bits for portions of the cache memory still operating (element 550). Continuing with the previous example, cache controller 452 may maintain root-node bits and lower-node bits in array 454 and array 480 as cache controller 452 continues to store data in the cache lines of the banks for macro 456. The system may also set higher-node bits for the cache memory device (element 560). For example, in addition to root-node and lower-node, higher-node bits associated with the other banks of cache memory 453, other than the banks of macros 456 and 466, may reside in arrays 454 and 480. Such higher-node bits may provide state status for the data of the cache lines located in the other banks and/or macros.

Alternative embodiments may perform other actions in addition to the actions depicted in FIG. 5. Further alternative embodiments may not perform all of the actions depicted in FIG. 5. For example, while the embodiment of the method depicted in flowchart 500 includes switching root-node bits to reduce power consumption, one alternative embodiment may not perform such switching of the root-node bits. The embodiment may not switch the root-node bits because the root-node bits may not be distributed but rather reside in a centralized array or centralized structure, such as structure 323 depicted in FIG. 3C. Further, many embodiments may not switch higher-node bits because the system may utilize only root-node and lower-node bits.

Those skilled in the art, having the benefit of this disclosure, will realize that the present disclosure contemplates the design and operation of replacement policy bits in cache memories, such as least recently used state bits of cache memories. The form of the embodiments shown and described in the detailed description and the drawings should be taken merely as examples. The following claims are intended to be interpreted broadly to embrace all variations of the example embodiments disclosed.

Although the present disclosure and some of its advantages have been described in detail for some embodiments, one skilled in the art should understand that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
    enabling state bits of a pseudo least recently used (LRU) scheme of a cache memory device, wherein the state bits comprise root-node bits and lower-node bits for cache lines of the cache memory device, wherein further the lower-node bits are distributed in a plurality of structures of the cache memory device;
    disabling bits of a data structure of the cache memory device to reduce power consumption; and
    disabling state bits associated with the data structure, wherein the disabling the state bits comprises switching a plurality of the lower-node bits associated with the data structure.

2. The method of claim 1, wherein the enabling the state bits comprise enabling state bits for cache lines arranged into ways and sets.

3. The method of claim 2, wherein the disabling bits of the data array of the cache memory device comprises turning off data bits of a bank of a non-uniform cache access (NUCA) cache of a computing device.

4. The method of claim 1, wherein the root-node bits are stored in a centralized structure, separate from the lower-node bits.

5. The method of claim 1, wherein the root-node bits are distributed with the lower-node bits in the plurality of structures.

6. An apparatus, comprising:
    a plurality of decentralized arrays of a cache memory, wherein state bits of a pseudo least recently used (LRU) scheme for the cache memory comprise root-node bits and lower-node bits, wherein further the lower-node bits are stored in the plurality of decentralized arrays; and
    a cache controller to turn off the lower-node bits to conserve power.

7. The apparatus of claim 6, further comprising a power management module to turn off portions of the cache memory to conserve power.

8. The apparatus of claim 6, wherein root-node bits are stored in a centralized array of the cache memory, wherein further the centralized array comprises validity bits and coherency bits.

9. The apparatus of claim 8, wherein the cache memory is configured to apply power to the centralized array while some of the decentralized arrays are turned off, wherein further the centralized array comprises higher-node bits.

10. The apparatus of claim 6, wherein root-node bits are stored in the decentralized arrays with the lower-node bits.

11. The apparatus of claim 6, wherein the cache memory comprises a uniform cache access (UCA) cache.

12. The apparatus of claim 6, wherein the cache memory comprises an L3 non-uniform cache access (NUCA) cache module and the cache controller comprises a state machine.

13. The apparatus of claim 12, wherein the cache controller is arranged to turn off banks of the ways and turn off validity bits, coherency bits, and tag bits associated with the ways.

14. The apparatus of claim 12, wherein the cache controller is arranged to turn off banks of the ways and leave at least one of validity bits, coherency bits, and tag bits of the ways enabled, wherein further the root-node bits and lower-node bits comprise bits of a pseudo LRU tree.

15. A system comprising:
    a plurality of processors;
    a plurality of banks of a cache memory device coupled to the plurality of processors, wherein the cache memory device comprises a plurality of decentralized arrays; and a cache controller to set state bits of a pseudo least recently used (LRU) scheme for the plurality of banks, wherein the state bits comprise root-node bits and lower-node bits, wherein further the lower-node bits are stored in the plurality of decentralized arrays, wherein further the cache controller is configured to turn off at a portion of the plurality of decentralized arrays to conserve power.

16. The system of claim 15, wherein the cache memory device comprises at least one centralized array to store root-node bits.

17. The system of claim 16, wherein the centralized array remains powered while some of the decentralized arrays are turned off.

18. The system of claim 15, wherein root-node bits are stored in the decentralized arrays with the lower-node bits.

19. The system of claim 18, wherein the decentralized arrays comprise tag information for data arrays.

20. The system of claim 19, wherein the tag information comprises at least one of validity bits and coherency bits, wherein further the cache memory device comprises a non-uniform cache access (NUCA) cache with horizontally-striped ways.

* * * * *